(12) United States Patent
Cmielowski et al.

(10) Patent No.: US 11,475,324 B2
(45) Date of Patent: Oct. 18, 2022

(54) DYNAMIC RECOMMENDATION SYSTEM FOR CORRELATED METRICS AND KEY PERFORMANCE INDICATORS

(71) Applicant: International Business Machines Corporation, Armonk, NY (US)

(72) Inventors: Lukasz G. Cmielowski, Cracow (PL); Maksymilian Erazmus, Zasow (PL); Rafal Bigaj, Cracow (PL); Wojciech Sobala, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 16/691,380

(22) Filed: Nov. 21, 2019

(65) Prior Publication Data
US 2021/0158179 A1 May 27, 2021

(51) Int. Cl.
*G06N 5/04* (2006.01)
*G06N 20/00* (2019.01)
*G06F 17/18* (2006.01)

(52) U.S. Cl.
CPC .............. *G06N 5/04* (2013.01); *G06F 17/18* (2013.01); *G06N 20/00* (2019.01)

(58) Field of Classification Search
CPC ........... G06N 5/04; G06N 20/00; G06F 17/18
USPC ......................................................... 706/12
See application file for complete search history.

(56) References Cited

U.S. PATENT DOCUMENTS

| 10,503,145 | B2* | 12/2019 | Germann | B23K 11/00 |
|---|---|---|---|---|
| 2013/0132108 | A1 | 5/2013 | Solilov et al. | |
| 2017/0357240 | A1 | 12/2017 | Stewart et al. | |
| 2018/0240015 | A1* | 8/2018 | Martin | G09B 7/00 |
| 2018/0247549 | A1* | 8/2018 | Martin | G09B 19/00 |
| 2018/0253677 | A1 | 9/2018 | Foster | |
| 2018/0330300 | A1* | 11/2018 | Runkana | G06Q 10/06 |
| 2019/0171950 | A1 | 6/2019 | Srivastava | |
| 2020/0082815 | A1* | 3/2020 | Haze | G10L 15/19 |
| 2021/0342744 | A1* | 11/2021 | Duplessis | G06F 16/903 |

OTHER PUBLICATIONS

Thorström, "Apply machine learning to key performance indicators: Master's thesis in Software Engineering," Department of Computer Science and Engineering, Chalmers University of Technology, University of Gothenburg, 2017, 80 pages.

* cited by examiner

*Primary Examiner* — William D Titcomb
(74) *Attorney, Agent, or Firm* — Yee & Associates, P.C.

(57) ABSTRACT

A method, apparatus, system, and computer program product for generating a human readable recommendation. The method determines, by a computer system, a key performance value for a key performance indicator from a collection of data; A metric value for a metric is determined by the computer system from the collection of data. A correlation coefficient indicating a correlation between the key performance indicator and the metric is identified by the computer system. A human readable recommendation is generated by the computer system using a recommendation pattern when the correlation coefficient indicates that the correlation between the key performance indicator and the metric is sufficiently significant.

20 Claims, 7 Drawing Sheets

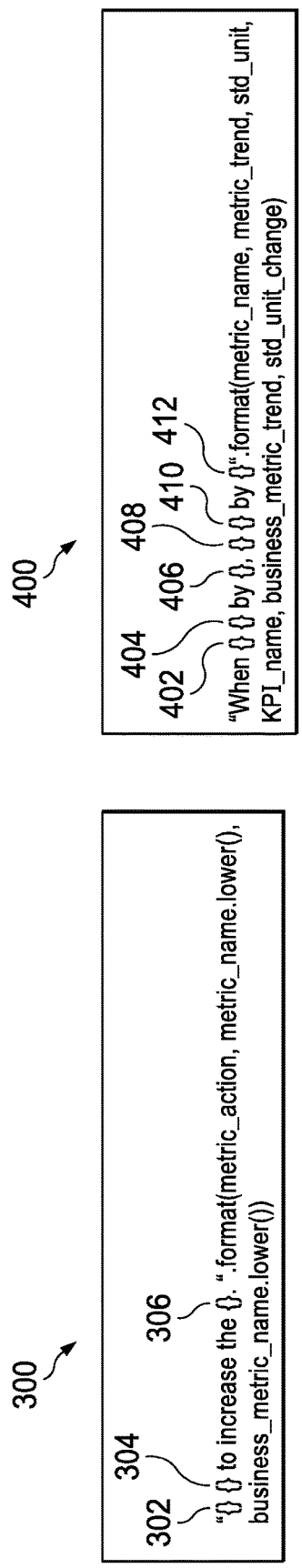
FIG. 3
FIG. 4
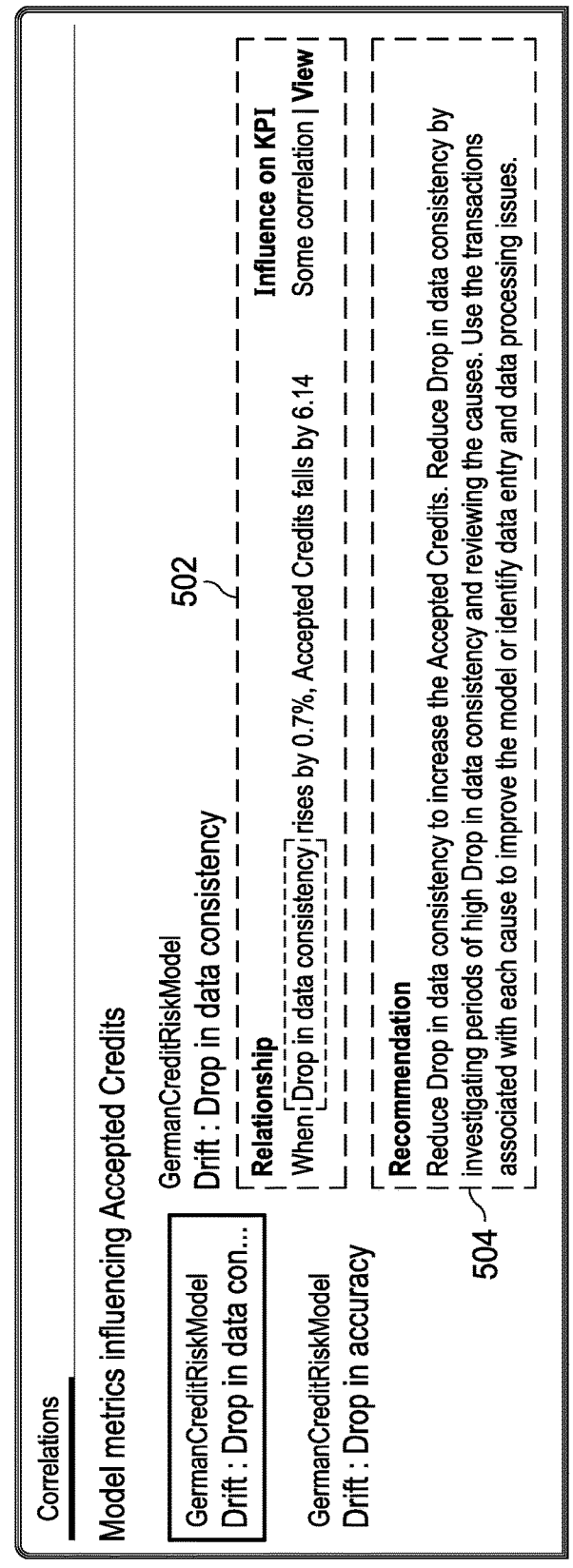
FIG. 5

DYNAMIC RECOMMENDATION SYSTEM FOR CORRELATED METRICS AND KEY PERFORMANCE INDICATORS

BACKGROUND

1. Field

The disclosure relates generally to an improved computer system and more specifically to a method, apparatus, system, and computer program product for dynamically generating recommendations for correlated artificial intelligence metrics and key performance indicators.

2. Description of the Related Art

Performance indicators such as key performance indicators (KPIs) are a type of performance measurement and can be made for an individual, a group, an organization, a system, or component. A key performance indicator can be used to measure how effective a person or organization is at achieving an objective. Key performance indicators can be used to track whether objectives have been met. For example, a key performance indicator can have a target and a timeframe for achieving the target.

Metrics are used to track and provide data about a process in an organization. Metrics, however, do not indicate whether goals for other types of performance measurements are being met. Metrics can be used to determine how the process in an organization is performing at a particular point in time.

SUMMARY

According to one embodiment of the present invention, a method generates a human readable recommendation. The method determines, by a computer system, a key performance value for a key performance indicator from a collection of data; A metric value for a metric is determined by the computer system from the collection of data. A correlation coefficient indicating a correlation between the key performance indicator and the metric is identified by the computer system. A human readable recommendation is generated by the computer system using a recommendation pattern when the correlation coefficient indicates that the correlation between the key performance indicator and the metric is sufficiently significant.

According to another embodiment of the present invention, a recommendation system comprises a computer system that determines a key performance value for a key performance indicator from a collection of data. The computer system determines a metric value for a metric from the collection of data; and identifies a correlation coefficient indicating a correlation between the key performance indicator and the metric. The computer system generates a human readable recommendation using a recommendation pattern when the correlation coefficient indicates that the correlation between the key performance indicator and the metric is sufficiently significant.

According to yet another embodiment of the present invention, a computer program product for generating a human readable recommendation comprises a computer-readable storage media with first program code, second program code, third program code, and fourth program code stored on the computer-readable storage media. The first program code is executed to determine a key performance value for a key performance indicator from a collection of data. The second program code is executed to determine a metric value for a metric from the collection of data. The third program code is executed to identify a correlation coefficient indicating a correlation between the key performance indicator and the metric. The fourth program code is executed to generate a human readable recommendation using a recommendation pattern when the correlation coefficient indicates that the correlation between the key performance indicator and the metric is sufficiently significant.

BRIEF DESCRIPTION OF THE DRAWINGS

FIG. 3 is an illustration of a recommendation pattern in accordance with an illustrative embodiment;

FIG. 4 is an illustration of a relationship pattern is depicted in accordance with an illustrative embodiment;

FIG. 5 is a human readable relationship and a human readable recommendation displayed in a screen interface in accordance with an illustrative embodiment;

DETAILED DESCRIPTION

Figure 1:
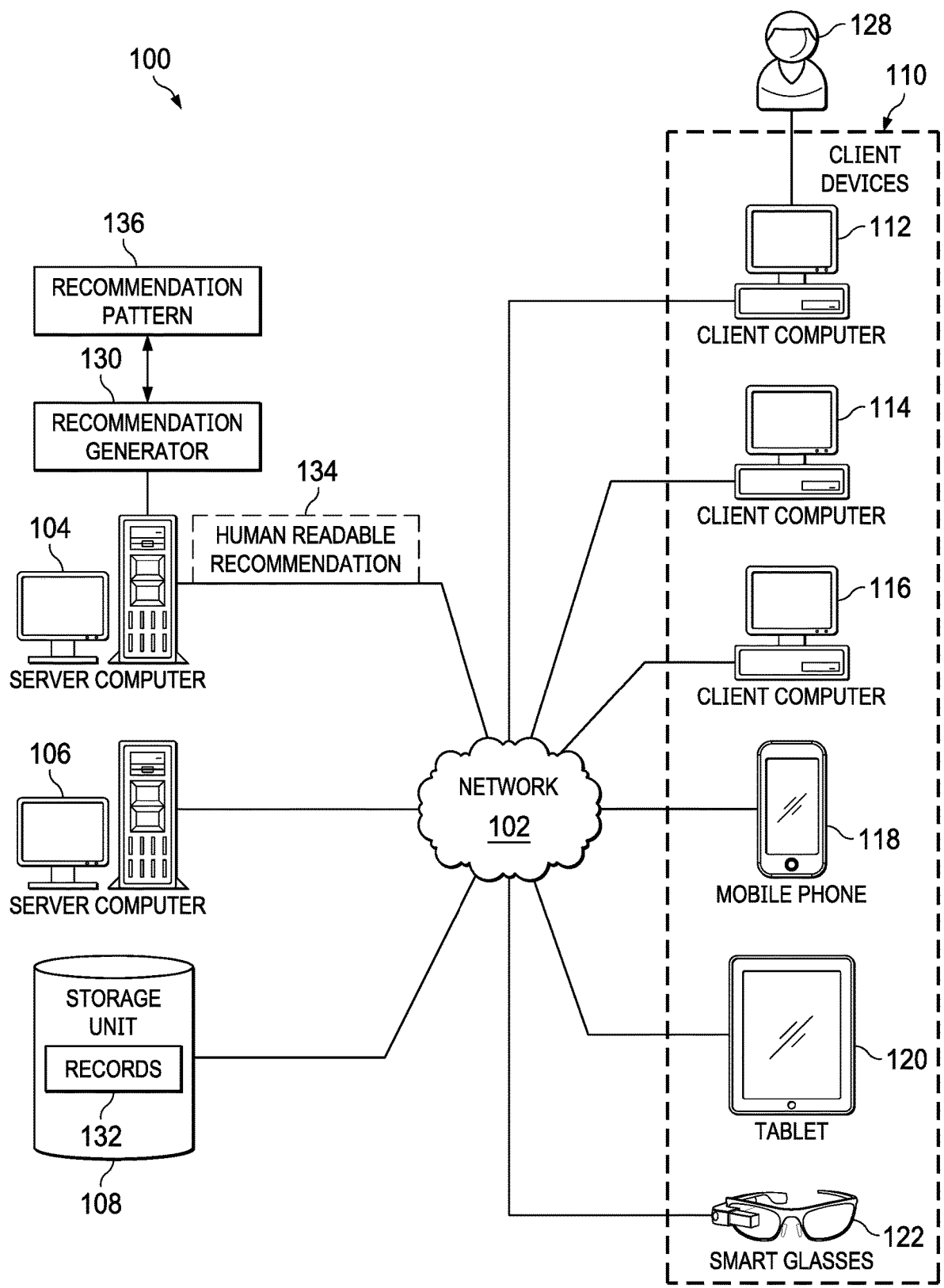
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that key performance indicators and metrics are presented as values. The illustrative embodiments recognize and take into account that interpreting values can be more difficult and challenging than desired.

The illustrative embodiments recognize and take into account that metrics can be derived using artificial intelligence systems. The illustrative embodiments recognize and take into account that artificial intelligence systems can be trained to analyze data in an organization to generate metrics about processes in the organization. The illustrative embodiments also recognize and take into account that finding a relationship between artificial intelligence metrics about an organizational process and key performance indicators measuring the successful the organization is usable to perform actions in the organization to improve the key performance indicators. The illustrative embodiments recognize and take into account that correlations can be identified between artificial intelligence metrics and key performance indicators. The Illustrative embodiments recognize and take into account that these correlations can take the form of numbers that can also be difficult to interpret by someone who does not have training or experience with correlation techniques.

Thus, the illustrative embodiments provide a method, apparatus, and computer program product for generating a human readable recommendation from metrics and key performance indicators. With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 128 at client computer 114 can perform various actions in an organization. In formulating or performing an action, user 128 can analyze metrics and key performance indicators. For example, user 128 may analyze credit information to determine whether to change processes for handling credit applications. In another example, user 128 can review metrics and performance indicators relating to an information technology system in a company to determine if information technology processes should be changed.

In this illustrative example, recommendation generator 130 running in server computer 104 can provide assistance to user 128 in performing analysis of metrics and key performance indicators. For example, recommendation generator 130 can determine key performance values for a key performance indicator from records 132. As depicted, recommendation generator 130 can also determine metric values for a metric from records 132 located in storage unit 108. In this illustrative example, a metric value for the metric is determined for a batch of records 132 from batches of records 132. Additionally, a key performance indicator value can be determined for the key performance indicator for a batch of records 132 from batches of records 132. These two values are correlated to each other based on identifiers such as batch identifiers. In other words, each batch will have a key performance indicator value and a metric value.

With the values for the key performance indicator and the metric, recommendation generator 130 can determine the correlation between the key performance indicators and metrics. This correlation can be represented by a correlation coefficient that indicates how closely dependent the key performance indicators and metrics are to each other.

As depicted, recommendation generator 130 can generate human readable recommendation 134 using recommendation pattern 136 when the correlation coefficient indicates the correlation between the key performance indicator and the metric is sufficiently significant. Human readable recommendation 134 is sent to client computer 114 for display to user 128. Human readable recommendation 134 is provided in a manner that enables user 128 to understand what action may be taken based on the values of the key performance indicators and metric. Human readable recommendation 134 can be made in a manner that does not require user 128 to understand correlation coefficients and values for key performance indicators and metrics.

Figure 2:
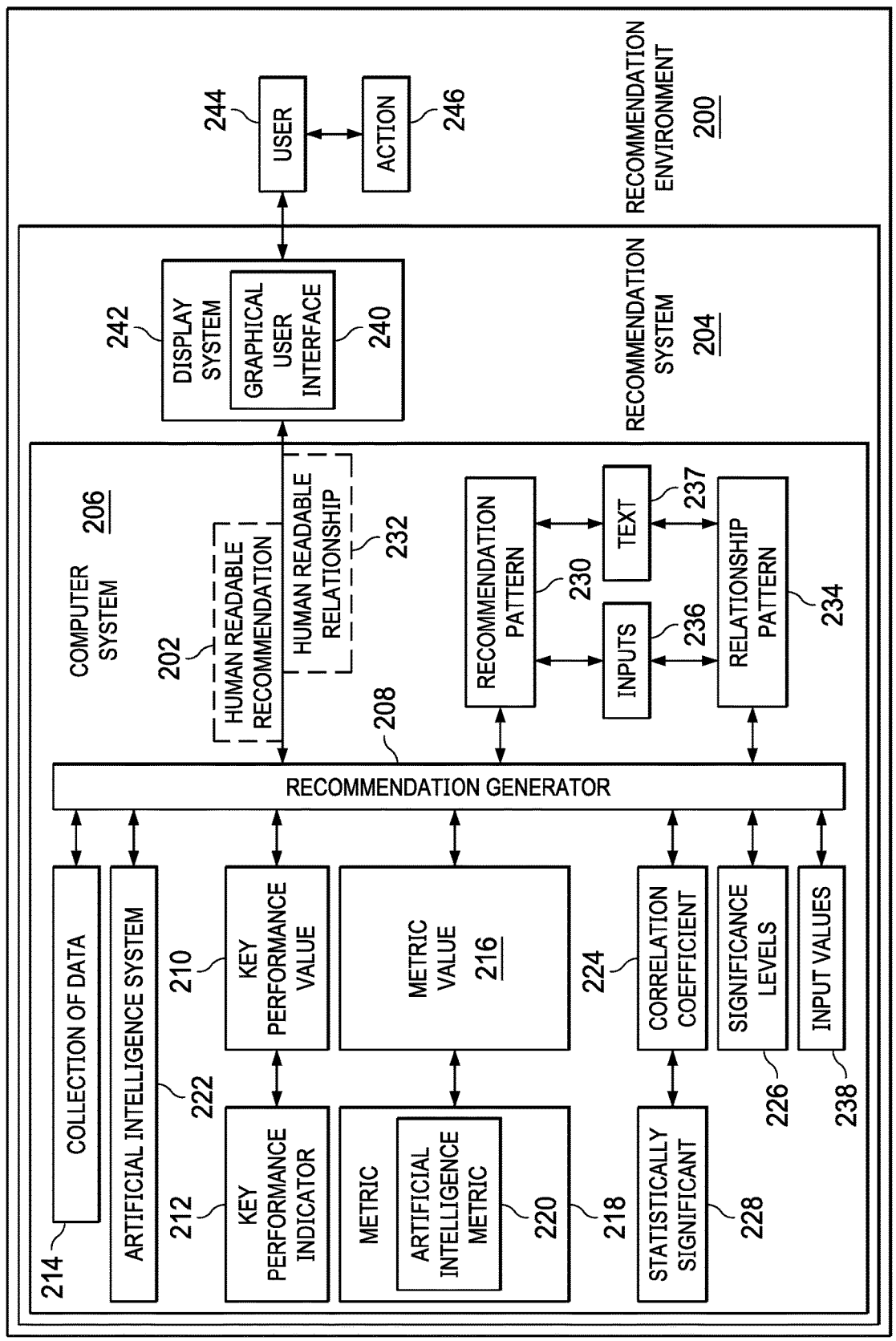
FIG. 2 is a block diagram of a recommendation environment in accordance with an illustrative embodiment.

With reference now to FIG. 2, a block diagram of a recommendation environment is depicted in accordance with an illustrative embodiment. In this illustrative example, recommendation environment 200 includes components that can be implemented in hardware such as the hardware shown in network data processing system 100 in FIG. 1.

In this illustrative example, recommendation environment 200 is an environment in which human readable recommendation 202 can be generated by recommendation system 204. As depicted, recommendation system 204 comprises computer system 206 and recommendation generator 208 in computer system 206.

Recommendation generator 208 can be implemented in software, hardware, firmware or a combination thereof. When software is used, the operations performed by recommendation generator 208 can be implemented in program code configured to run on hardware, such as a processor unit. When firmware is used, the operations performed by recommendation generator 208 can be implemented in program code and data and stored in persistent memory to run on a processor unit. When hardware is employed, the hardware may include circuits that operate to perform the operations in recommendation generator 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

In this illustrative example, recommendation generator 208 performs a number of different steps in generating human readable recommendation 202. For example, recommendation generator 208 determines key performance value 210 for key performance indicator 212 from collection of data 214. Recommendation generator 208 also determines metric value 216 for metric 218 from collection of data 214. In this illustrative example, metric 218 can be artificial intelligence metric 220 and metric value 216 can be an artificial intelligence system metric value. In other illustrative examples, other types of metric values can be determined by artificial intelligence system 222 or by other mechanisms. For example, metric value 216 also can be an information technology metric value, a manufacturing metric value, and a sales metric value.

Artificial intelligence system 222 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

As depicted, artificial intelligence system 222 can process multiple collections of data to determine values for artificial intelligence metric 220. With artificial intelligence system 222, the analysis of data to generate values for metrics can be automated using less user input or without requiring user input. Artificial intelligence system 222 can also be used to process data for generating key performance patterns.

In this illustrative example, recommendation generator 208 identifies correlation coefficient 224 indicating a correlation between key performance indicator 212 and metric 218. A determination is made as to whether correlation coefficient 224 is sufficiently significant to warrant further processing such generating human readable recommendation 202.

In this illustrative example, correlation coefficient 224 is compared to a set of significance levels 226. The set of significance levels 226 can be a set of values that indicate when correlation coefficient 224 is statistically significant 228. As used herein, a "set of," when used with two items, means one or more items. For example, a "set of values" is one or more values.

In this illustrative example, correlation coefficient 224 sufficiently significant when correlation coefficient 224 is statistically significant 228. In other illustrative examples, other thresholds for levels may be used to determine when correlation coefficient 224 is sufficiently significant.

In the illustrative example, the correlation is a statistical tool used to measure a relationship between two or more variables. The correlation indicates the degree to which variables are associated with each other such that change in one variable is accompanied by change in another variable. Various techniques can be used to determine correlations and generate a value indicating the correlation, such as correlation coefficient 224. These techniques include, for example, a scatter diagram method, Karl Pearson's Coefficient of Correlation, Spearman's Rank Correlation Coefficient, least mean squares, and other suitable techniques.

In another illustrative example, calculated coefficient of correlations can be placed into a matrix for use. With the example, the rows and columns in the matrix represent variables. For example, the columns can be key performance indicators, while the rows can be metrics. The values in the matrix are the correlation coefficients for the variables in the corresponding rows and columns.

In the illustrative example, correlation coefficient 224 for key performance indicator 212 and metric 218 can be considered statistically significant 228 when the likelihood of a relationship between these two variables is caused by something other than chance. For example, a probability value, p-value, of 5 percent or lower can be considered to be statistically significant. In this example, 5 percent is an example of a significance level in significance levels 226. Of course, the particular value or values selected can be dependent on a particular implementation.

Thus, in this example, when the probability value is less than or equal to the significance level, a conclusion that the correlation is different from zero can be made and can be considered statistically significant 228. If the probability is greater than a significance level, then the conclusion of significance is not made in this example.

As depicted, recommendation generator 208 generates human readable recommendation 202 using recommendation pattern 230 when correlation coefficient 224 indicates that the correlation between key performance indicator 212 and metric 218 is sufficiently significant 228. Further, recommendation generator 208 can also generate human readable relationship 232 using relationship pattern 234 when correlation coefficient 224 indicates that correlation between key performance indicator 212 and metric 218 is sufficiently significant 228.

In this illustrative example, human readable relationship 232 provides a description of the relationship between key performance indicator 212 and metric 218 to a user. This description can be provided in a manner such that the user does not need to interpret the data or values to comprehend a relationship between key performance indicator 212 and metric 218. The relationship can be, for example, a drop in metric 218 causes a rise in key performance indicator 212. As another example, the relationship can be that a rise in metric 218 results in a fall in key performance indicator 212.

As depicted, recommendation pattern 230 and relationship pattern 234 have inputs 236 and text 237. Inputs 236 in recommendation pattern 230 and relationship pattern 234 are filled with input values 238 calculated by recommendation generator 208 to create human readable recommendation 202 and human readable relationship 232. In this illustrative example, recommendation generator 208 calculates input values 238 for recommendation pattern 230 and for relationship pattern 234 when correlation coefficient 224 indicates that the correlation between key performance indicator 212 and metric 218 is statistically significant 228.

In this illustrative example, input values 238 can be for inputs 236 such as a metric name, a metric trend, a standard deviation unit that indicates an amount of change in metric 218, a key performance indicator name, a key performance indicator trend, and a standard deviation change that indicates the amount of change in the key performance indicator 212 caused by a change in the metric 218.

These input values are placed into the appropriate inputs in recommendation pattern 230 and relationship pattern 234 to form human readable recommendation 202 and human readable relationship 232, respectively. Multiple patterns can be present in which different patterns are for particular combinations of metrics and key performance indicators. The selection of recommendation pattern 230 and relationship pattern 234 can be based on metric 218 and key performance indicator 212.

Recommendation generator 208 displays human readable recommendation 202 on graphical user interface 240 in display system 242. Additionally, recommendation generator 208 can also display human readable relationship 232 on graphical user interface 240.

As result, user 244 can view human readable recommendation 202 and human readable relationship 232 to perform action 246 in the real world. Action 246 can be, for example, making changes recommended by human readable recommendation 202 to a process to cause key performance indicator 212 to move in a desired direction. In another illustrative example, user 244 may analyze particular operations or steps as recommended by human readable recommendation 202 to make changes to a process to cause key performance indicator 212 to move the desired direction.

Computer system 206 can be configured to perform at least one of the steps, operations, or actions described in the different illustrative examples using software, hardware, firmware or a combination thereof. As a result, computer system 206 operates as a special purpose computer system in which recommendation generator 208 in computer system 206 enables generating human readable recommendation 202. In particular, recommendation generator 208 transforms computer system 206 into a special purpose computer system as compared to currently available general computer systems that do not have recommendation generator 208.

In the illustrative example, the use of recommendation generator 208 in computer system 206 integrates processes into a practical application for method generating a human readable recommendation. In other words, recommendation generator 208 in computer system 206 is directed to a practical application of processes integrated into recommendation generator 208 in computer system 206 that determines a key performance value for a key performance indicator from a collection of data; determines a metric value for a metric from the collection of data; identifies a correlation coefficient indicating a correlation between the key performance indicator and the metric; and generates a human readable recommendation using a recommendation pattern when the correlation coefficient indicates that the correlation between the key performance indicator and the metric is sufficiently significant.

In this illustrative example, recommendation generator 208 in computer system 206 provides a tool to increase the speed at which a user can comprehend or understand data and the results of an analysis of the data more quickly as compared current systems.

The illustration of recommendation environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

With reference to FIG. 3, an illustration of a recommendation pattern is depicted in accordance with an illustrative embodiment. Recommendation pattern 300 is an example of one implementation for recommendation pattern 230 in FIG. 2. In this illustrative example, recommendation pattern 300 includes input 302, input 304, and input 306.

As depicted, input 302 is a metric action, input 304 is a metric name, and input 306 is a KPI name. The metric action is the action recommended. The metric name is the name of the metric for which the action is to be taken. The KPI name is the name of key performance indicator in this illustrative example. The values for these inputs can be calculated and filled to form the human readable recommendation. This recommendation can be displayed on graphical user interface and a display system to a user.

Turning now to FIG. 4, an illustration of a relationship pattern is depicted in accordance with an illustrative embodiment. Recommendation pattern 400 is an example of one implementation for relationship pattern 234 in FIG. 2. In this illustrative example, recommendation pattern 400 includes input 402, input 404, input 406, input 408, input 410, and input 412.

As depicted, input 402 is a metric name, input 404 is a metric trend, and input 406 is a standard deviation unit (std_unit). In this example, input 408 is KPI name, input 410 is KPI trend, and input 412 is standard deviation unit change (std_unit_change).

The KPI name is the name of the key performance indicator and the KPI metric trend is the trend of the key performance indicator. The standard deviation unit (std_unit) is the amount of the metric needs to change to cause a change in the KPI. The standard deviation unit change (sted_unit_change) is the amount or size of the change caused by the metric for the standard deviation unit.

In this illustrative example, the metric trend can be based on limits set for the metric. The limits can be upper and lower limits for which an upward or downward trend is defined. In this illustrative example, the standard deviation unit change can be used to determine the KPI trend.

The values for these inputs can be calculated and filled to form the human readable relationship. This relationship can be displayed on graphical user interface and a display system to a user.

Turning to FIG. 5, a human readable relationship and a human readable recommendation displayed in a screen interface is depicted in accordance with an illustrative embodiment. In this illustrative example, screen 500 is an example the screen that can be displayed in graphical user interface 240 in display system 242 in FIG. 2.

As depicted, human readable relationship 502 and human readable recommendation 504 are displayed in screen 500.

The example human readable patterns in FIGS. 3 and 4 and the screen in FIG. 5 are provided as examples of one manner in which these components can be implemented. These examples are not meant to limit the manner in which recommendation pattern 230 and relationship pattern 234 can be implemented in other examples. Other text can be used in addition to the text show in the Figures. The text can vary depend on the recommendation made.

Figure 6:
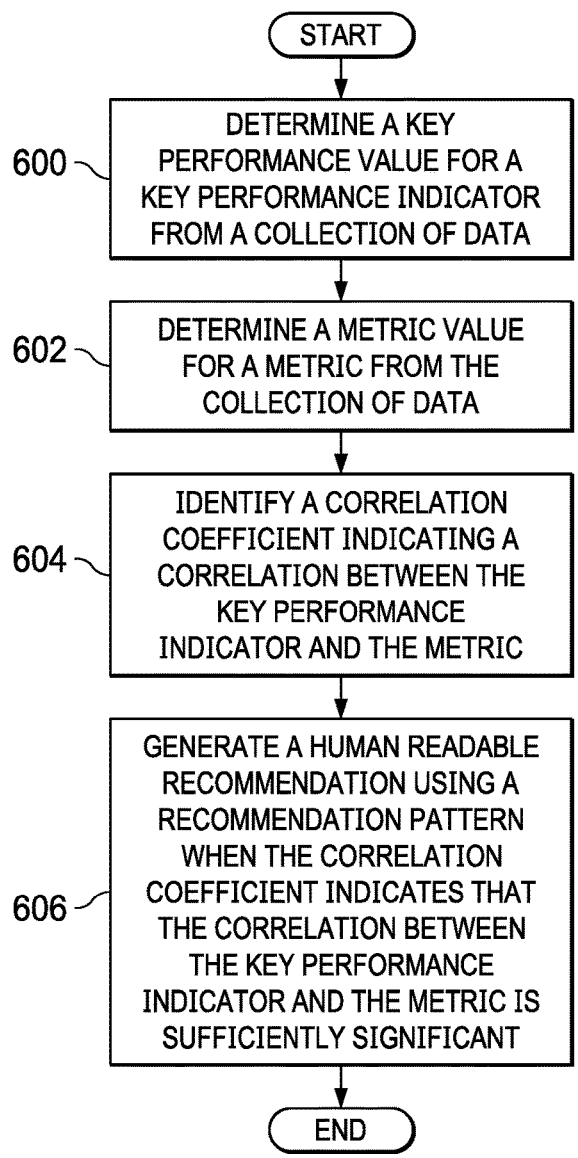
FIG. 6 is a flowchart of a process for generating a human readable recommendation in accordance with an illustrative embodiment.

Turning next to FIG. 6, a flowchart of a process for generating a human readable recommendation is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented recommendation generator 208 in in computer system 206 in FIG. 2.

The process begins by determining a key performance value for a key performance indicator from a collection of data (step 600). The process determines a metric value for a metric from the collection of data (step 602). The process identifies a correlation coefficient indicating a correlation between the key performance indicator and the metric (step 604).

The process generates a human readable recommendation using a recommendation pattern when the correlation coefficient indicates that the correlation between the key performance indicator and the metric is sufficiently significant (step 606). The process terminates thereafter.

Figure 7:
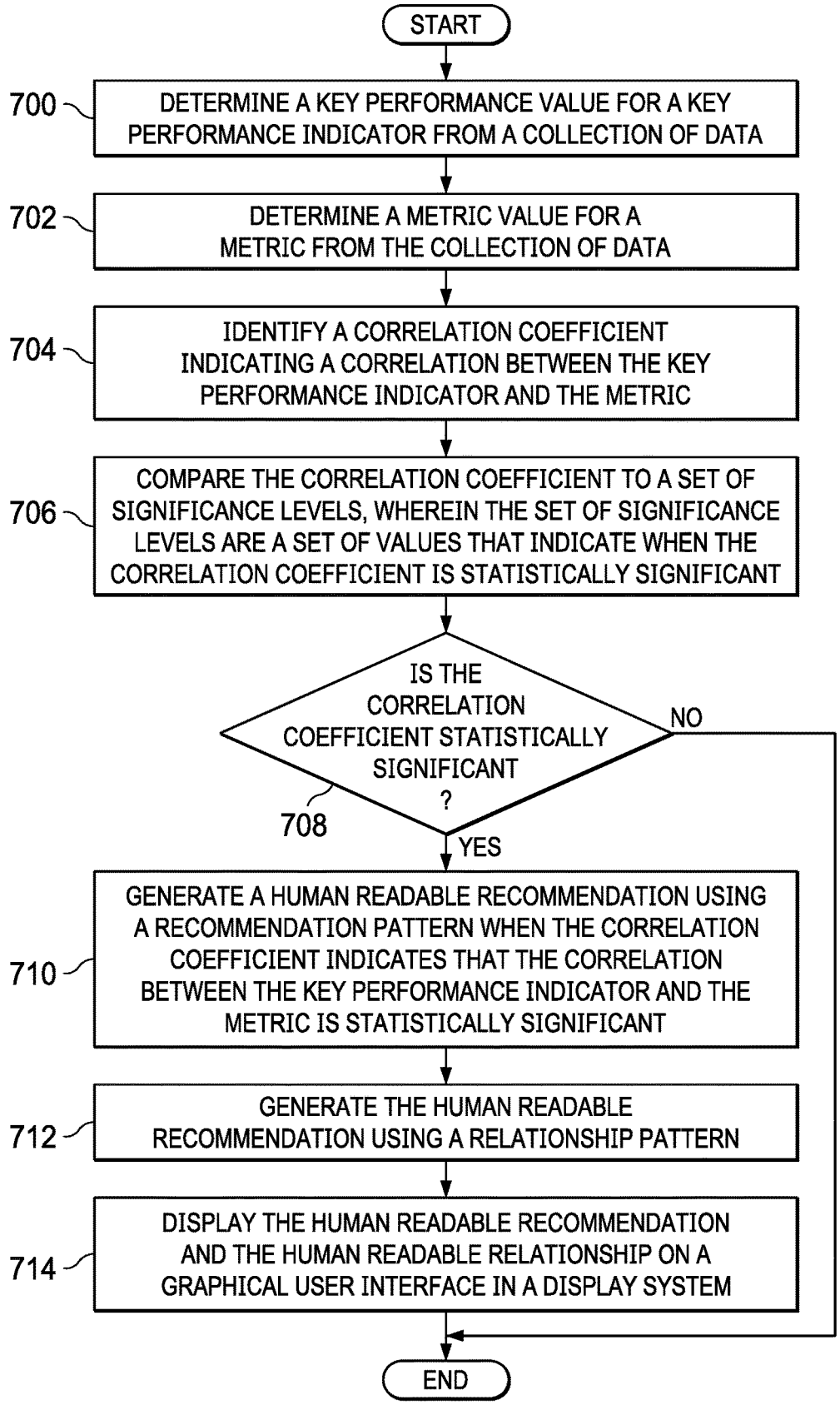
FIG. 7 is a more detailed flowchart of a process for generating human readable recommendation in accordance with an illustrative embodiment.

With reference next to FIG. 7, a more detailed flowchart of a process for generating human readable recommendation is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented recommendation generator 208 in in computer system 206 in FIG. 2.

The process begins by determining a key performance value for a key performance indicator from a collection of data (step 700). The process determines a metric value for a metric from the collection of data (step 702). The process identifies a correlation coefficient indicating a correlation between the key performance indicator and the metric (step 704).

The process compares the correlation coefficient to a set of significance levels, wherein the set of significance levels that are a set of values that indicate when the correlation coefficient is statistically significant (step 706). A determination is made as to whether the correlation code efficient is statistically significant (step 708).

If the correlation code efficient is statistically significant, the process generates a human readable recommendation using a recommendation pattern when the correlation coefficient indicates that the correlation between the key performance indicator and the metric is statistically significant (step 710). The process generates the human readable recommendation using a relationship pattern (step 712).

The process displays the human readable recommendation and the human readable relationship on a graphical user interface in a display system (step 714). The process terminates thereafter. With reference again to step 708, if the correlation code efficient is not statistically significant, the process terminates thereafter.

Figure 8:
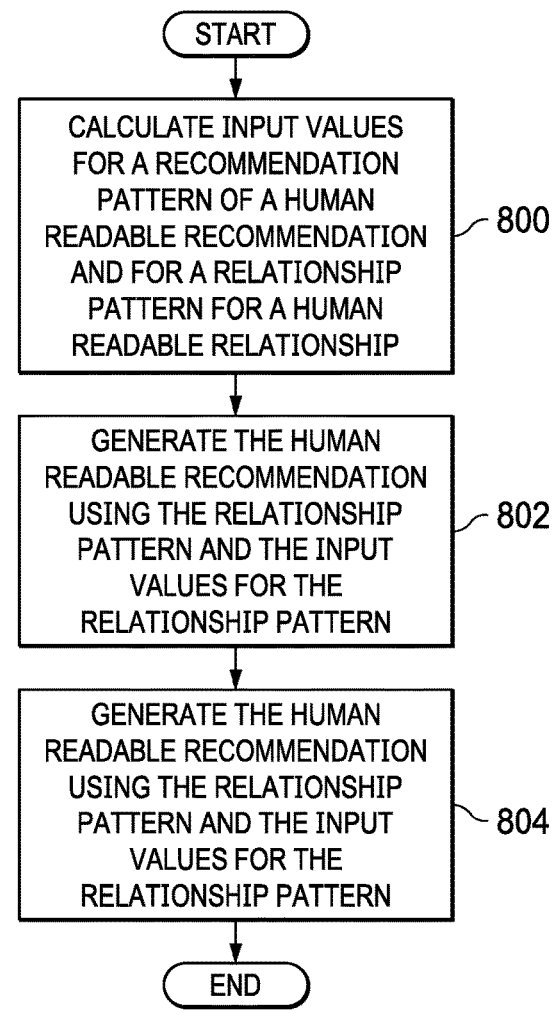
FIG. 8 is a more detailed flowchart of a process for generating human readable recommendation in accordance with an illustrative embodiment.

Turning next to FIG. 8, a more detailed flowchart of a process for generating human readable recommendation is depicted in accordance with an illustrative embodiment. The process in FIG. 8 is an example of an implementation for step 710 and step 712 in FIG. 7.

The process begins by calculating input values for a recommendation pattern of the human readable recommendation and for a relationship pattern for the human readable relationship (step 800). The process generates the human readable recommendation using the relationship pattern and the input values for the relationship pattern (step 802). The process generates the human readable recommendation using the relationship pattern and the input values for the relationship pattern (step 804). The process terminates thereafter.

Figure 9:
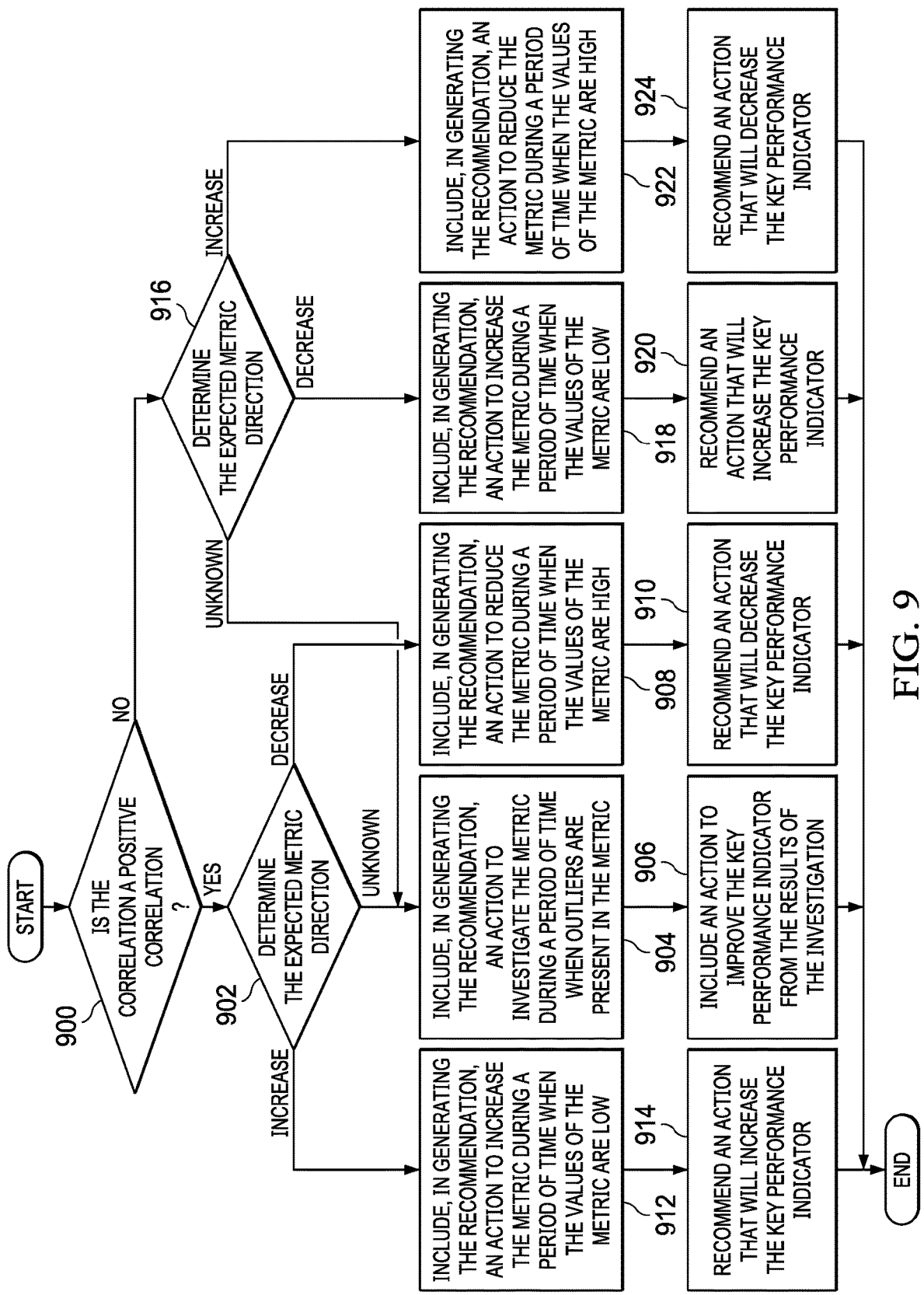
FIG. 9 is a flowchart of a process for building a recommendation in accordance with an illustrative embodiment.

Turning next to FIG. 9, a flowchart of a process for building a recommendation is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented recommendation generator 208 in in computer system 206 in FIG. 2.

This process can be used to determine actions and periods of time when actions should be taken. These determinations can be used to select a recommendation pattern of use in generating a recommendation. This process is initiated when a significant correlation is present. In other words, when the correlation coefficient is considered to be statistically significant, this process can be initiated to build a recommendation.

The process begins by determining whether the correlation is a positive correlation (step 900). If the correlation is a positive correlation, a determination of the expected metric direction is made (step 902).

If the expected metric direction is unknown, the process, in generating the recommendation, includes an action to investigate the metric during periods of time when outliers are present in the metric (step 904). In this illustrative example, the outliers can be when values of the metric are at least one of the above a first threshold or below a second threshold that is considered to be normal for the metric. The process includes an action to improve the key performance indicator from the results of the investigation (step 906). The process terminates thereafter.

With reference again to step 902, if the expected metric direction is decrease, the process includes, in generating the recommendation, an action to reduce the metric during periods of time when the values of the metric are high (step 908). The metric can be considered to be high when the value is greater than a selected threshold for the metric. The process then recommends an action that will decrease the key performance indicator (step 910). The process terminates thereafter.

Turning back to step 902, if the expected metric direction is increase, the process includes, in generating the recommendation, an action to increase the metric during periods of time when the values of the metric are low (step 912). The metric can be considered to be low when the value is less than a selected threshold for the metric. The process then recommends an action that will increase the key performance indicator (step 914). The process terminates thereafter.

Turning back to step 900, if the correlation is not a positive correlation, the process determines the expected metric direction (step 916). If the expected metric direction is unknown, the process proceeds to step 904 as described above.

With reference again to step 916, if the expected metric direction is decrease, the process includes, in generating the recommendation, an action to increase the metric during periods of time when the values of the metric are low (step 918). The metric can be considered to be low when the value of the metric is greater than a selected threshold for the metric. The process then recommends an action that will increase the key performance indicator (step 920). The process terminates thereafter.

Turning back to step 916, if the expected metric direction is increase, the process includes, in generating the recommendation, an action to reduce the metric during periods of time when the values of the metric are high (step 922). The metric can be considered to be low when the value is less than a selected threshold for the metric. The process then recommends an action that will decrease the key performance indicator (step 924). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
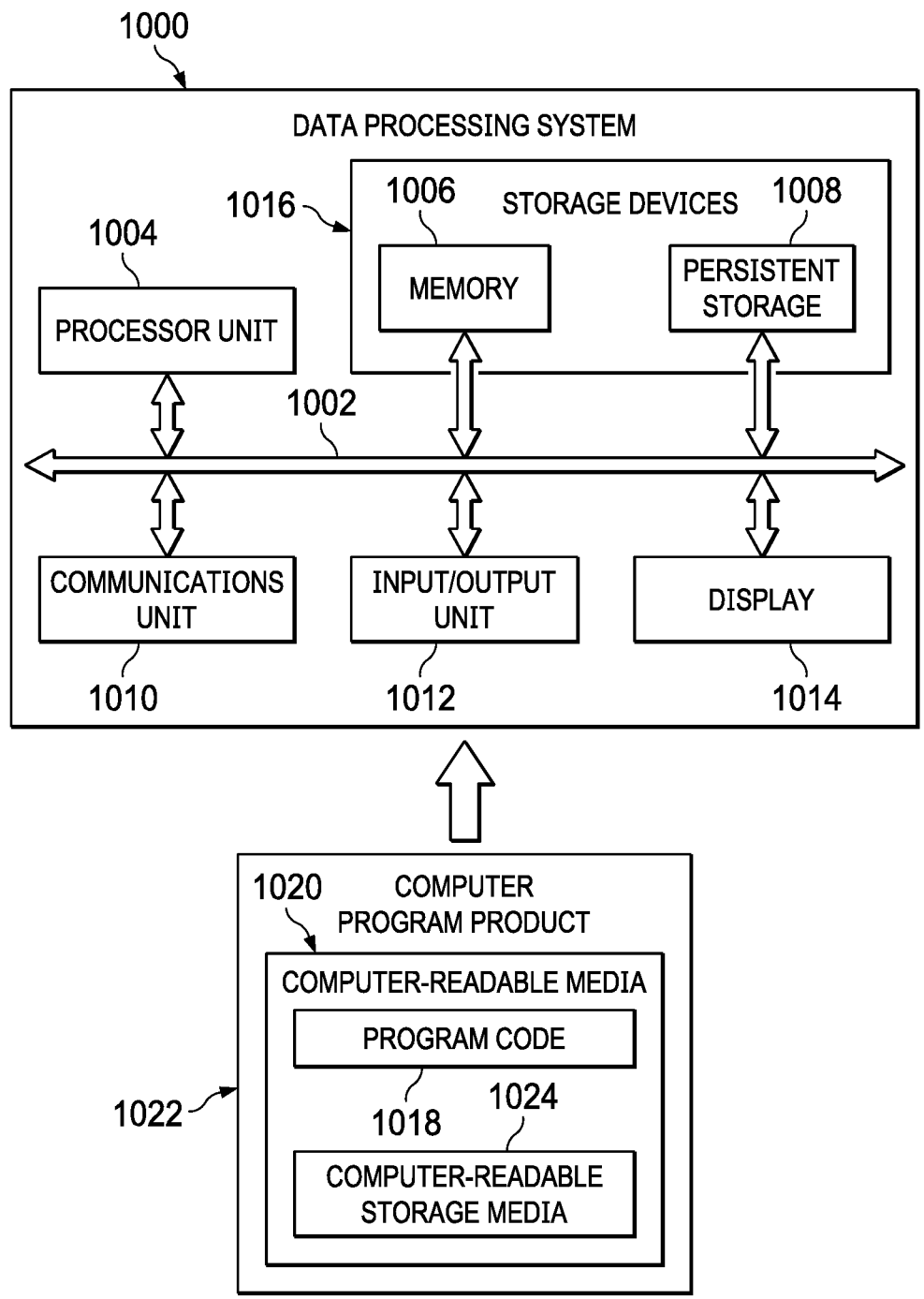
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 206 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative embodiments of the present invention provide a computer implemented method, computer system, and computer program product for generating a human readable recommendation. The method determines, by a computer system, a key performance value for a key performance indicator from a collection of data. A metric value for a metric is determined by the computer system from the collection of data. A correlation coefficient indicating a correlation between the key performance indicator and the metric is identified by the computer system. A human readable recommendation is generated by the computer system using a recommendation pattern when the correlation coefficient indicates that the correlation The illustrative example provides a tool to increase the speed at which a user can comprehend or understand data and the results of an analysis of the data more quickly as compared current systems. The tool displays human readable recommendations and relationships to a user that does not have training or experience with statistical techniques or analysis.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for dynamically generating a human readable recommendation for correlated artificial intelligence metrics and key performance indicators, the method comprising:
  determining, by a computer system, a key performance value for a key performance indicator from a collection of data;
  determining, by an artificial intelligence system of the computer system, a metric value for a metric from the collection of data;
  identifying, by the computer system, a correlation coefficient indicating a correlation between the key performance indicator and the metric; and
  performing, by the computer system, an action to make a change to a process to cause the key performance indicator to move in a desired direction.

2. The method of claim 1 further comprising:
  comparing, by the computer system, the correlation coefficient to a set of significance levels, wherein the set of significance levels are a set of values that indicate when the correlation coefficient is statistically significant, and wherein the correlation coefficient is sufficiently significant when the correlation coefficient is statistically significant;
  generating, by the computer system, the human readable recommendation using a recommendation pattern when the correlation coefficient indicates that the correlation between the key performance indicator and the metric is sufficiently significant, wherein the human readable recommendation comprises a description of a relationship between the key performance indicator and the metric; and
  displaying, by the computer system, the human readable recommendation on a graphical user interface in a display system.

3. The method of claim 2, wherein generating, by the computer system, the human readable recommendation using the recommendation pattern when the correlation coefficient indicates that the correlation between the key performance indicator and the metric is sufficiently significant comprises:

calculating, by the computer system, input values for the recommendation pattern when the correlation coefficient indicates that the correlation between the key performance indicator and the metric is sufficiently significant; and generating, by the computer system, the human readable recommendation using the recommendation pattern and the input values for the recommendation pattern.

4. The method of claim 2, wherein generating, by the computer system, the human readable recommendation using the recommendation pattern when the correlation coefficient indicates that the correlation between the key performance indicator and the metric is sufficiently significant comprises:

generating, by the computer system, the human readable recommendation using the recommendation pattern when the correlation coefficient indicates that the correlation between the key performance indicator and the metric is sufficiently significant; and generating, by the computer system, a human readable relationship using a relationship pattern when the correlation coefficient indicates that the correlation between the key performance indicator and the metric is sufficiently significant.

5. The method of claim 4, wherein generating, by the computer system, the human readable recommendation using the recommendation pattern when the correlation coefficient indicates that the correlation between the key performance indicator and the metric is sufficiently significant comprises:

calculating, by the computer system, input values for the recommendation pattern when the correlation coefficient indicates that the correlation between the key performance indicator and the metric is sufficiently significant;

generating, by the computer system, the human readable recommendation using the recommendation pattern and the input values for the recommendation pattern; and wherein generating, by the computer system, the human readable relationship using the relationship pattern when the correlation coefficient indicates that the correlation between the key performance indicator and the metric is sufficiently significant comprises:

calculating, by the computer system, the input values for the relationship pattern when the correlation coefficient indicates that the correlation between the key performance indicator and the metric is sufficiently significant; and generating, by the computer system, the human readable recommendation using the relationship pattern and the input values for the relationship pattern.

6. The method of claim 5, wherein the input values are for a metric name, a metric trend, a standard deviation unit that indicates an amount of change in the metric, a key performance indicator name, a key performance indicator trend, and a standard deviation change that indicates an amount of change in the key performance indicator caused by a change in the metric.

7. The method of claim 1 further comprising:

determining, by the computer system, whether the correlation coefficient indicates a positive or negative correlation between the key performance indicator and the metric;

responsive to determining that the correlation coefficient indicates the positive correlation:

determining, by the computer system, an expected metric direction of the metric;

generating, by the computer system responsive to determining that the expected metric direction of the metric is increase, an action recommendation to increase the metric during a period of time when the metric values of the metric are high based on a threshold; and generating, by the computer system responsive to determining that the expected metric direction of the metric is decrease, an action recommendation to reduce the metric during a period of time when the metric values of the metric are low based on the threshold;

responsive to determining that the correlation coefficient indicates the negative correlation:

determining, by the computer system, the expected metric direction of the metric;

generating, by the computer system responsive to determining that the expected metric direction of the metric is increase, an action recommendation to reduce the metric during a period of time when the metric values of the metric are high based on the threshold; and generating, by the computer system responsive to determining that the expected metric direction of the metric is decrease, an action recommendation to increase the metric during a period of time when the metric values of the metric are low based on the threshold.

8. The method of claim 1, wherein the metric value is artificial intelligence metric value.

9. A recommendation system for dynamically generating a human readable recommendation for correlated artificial intelligence metrics and key performance indicators comprising:

a computer system that determines a key performance value for a key performance indicator from a collection of data; determines a metric value for a metric from the collection of data by an artificial intelligence system; identifies a correlation coefficient indicating a correlation between the key performance indicator and the metric; and performs an action to make a change to a process to cause the key performance indicator to move in a desired direction.

10. The recommendation system of claim 9, wherein the computer system:

compares the correlation coefficient to a set of significance levels, wherein the set of significance levels are a set of values that indicate when the correlation coefficient is statistically significant, and wherein the correlation coefficient is sufficiently significant when the correlation coefficient is statistically significant;

generates the human readable recommendation using a recommendation pattern when the correlation coefficient indicates that the correlation between the key performance indicator and the metric is sufficiently significant, wherein the human readable recommendation comprises a description of a relationship between the key performance indicator and the metric; and displays the human readable recommendation on a graphical user interface in a display system.

11. The recommendation system of claim 10, wherein in generating, by the computer system, the human readable recommendation using the recommendation pattern when the correlation coefficient indicates that the correlation between the key performance indicator and the metric is sufficiently significant, the computer system calculates input values for the recommendation pattern when the correlation coefficient indicates that the correlation between the key performance indicator and the metric is sufficiently significant and generates the human readable recommendation using the recommendation pattern and the input values for the recommendation pattern.

12. The recommendation system of claim 10, wherein in generating the human readable recommendation using the recommendation pattern when the correlation coefficient indicates that the correlation between the key performance indicator and the metric is sufficiently significant, the computer system generates the human readable recommendation using the recommendation pattern when the correlation coefficient indicates that the correlation between the key performance indicator and the metric is sufficiently significant and generates a human readable relationship using a relationship pattern when the correlation coefficient indicates that the correlation between the key performance indicator and the metric is sufficiently significant.

13. The recommendation system of claim 12, wherein in generating the human readable recommendation using the recommendation pattern when the correlation coefficient indicates that the correlation between the key performance indicator and the metric is sufficiently significant, the computer system calculates input values for the recommendation pattern when the correlation coefficient indicates that the correlation between the key performance indicator and the metric is sufficiently significant and generates the human readable recommendation using the recommendation pattern and the input values for the recommendation pattern; and
 wherein in generating the human readable relationship using the relationship pattern when the correlation coefficient indicates that the correlation between the key performance indicator and the metric is sufficiently significant, the computer system calculates the input values for the relationship pattern when the correlation coefficient indicates that the correlation between the key performance indicator and the metric is sufficiently significant and generates the human readable recommendation using the relationship pattern and the input values for the relationship pattern.

14. The recommendation system of claim 13, wherein the input values are for a metric name, a metric trend, a standard deviation unit that indicates an amount of change in the metric, a key performance indicator name, a key performance indicator trend, and a standard deviation change that indicates an amount of change in the key performance indicator caused by a change in in the metric.

15. The recommendation system of claim 9, wherein the computer system
 determines whether the correlation coefficient indicates a positive or negative correlation between the key performance indicator and the metric;
 responsive to determining that the correlation coefficient indicates the positive correlation:
  determines an expected metric direction of the metric;
  generates an action recommendation to increase the metric during a period of time when the metric values of the metric are high based on a threshold responsive to determining that the expected metric direction of the metric is increase; and
  generating an action recommendation to reduce the metric during a period of time when the metric values of the metric are low based on the threshold responsive to determining that the expected metric direction of the metric is decrease;
 responsive to determining that the correlation coefficient indicates the negative correlation:
  determines the expected metric direction of the metric;
  generates an action recommendation to reduce the metric during a period of time when the metric values of the metric are high based on the threshold responsive to determining that the expected metric direction of the metric is increase; and
  generates an action recommendation to increase the metric during a period of time when the metric values of the metric are low based on the threshold responsive to determining that the expected metric direction of the metric is decrease.

16. A computer program product for dynamically generating a human readable recommendation for correlated artificial intelligence metrics and key performance indicators, the computer program product comprising:
 a computer-readable storage media;
 first program code, stored on the computer-readable storage media, for determining a key performance value for a key performance indicator from a collection of data;
 second program code, stored on the computer-readable storage media, for determining a metric value for a metric from the collection of data by an artificial intelligence system;
 third program code, stored on the computer-readable storage media, for identifying a correlation coefficient indicating a correlation between the key performance indicator and the metric; and
 fourth program code, stored on the computer-readable storage media, for performing an action to make a change to a process to cause the key performance indicator to move in a desired direction.

17. The computer program product of claim 16 further comprising:
 fifth program code, stored on the computer-readable storage media, for comparing the correlation coefficient to a set of significance levels, wherein the set of significance levels are a set of values that indicate when the correlation coefficient is statistically significant, and wherein the correlation coefficient is sufficiently significant when the correlation coefficient is statistically significant;
 sixth program code, stored on the computer-readable storage media, for generating the human readable recommendation using a recommendation pattern when the correlation coefficient indicates that the correlation between the key performance indicator and the metric is sufficiently significant, wherein the human readable recommendation comprises a description of a relationship between the key performance indicator and the metric; and
 seventh program code, stored on the computer-readable storage media, for displaying the human readable recommendation on a graphical user interface in a display system.

18. The computer program product of claim 16 further comprising:
 fifth program code, stored on the computer-readable storage media, for determining whether the correlation coefficient indicates a positive or negative correlation between the key performance indicator and the metric;
 sixth program code, stored on the computer-readable storage media and responsive to determining that the correlation coefficient indicates the positive correlation, for:
  determining an expected metric direction of the metric;

generating an action recommendation to increase the metric during a period of time when the metric values of the metric are high based on a threshold responsive to determining that the expected metric direction of the metric is increase; and generating an action recommendation to reduce the metric during a period of time when the metric values of the metric are low based on the threshold responsive to determining that the expected metric direction of the metric is decrease;

seventh program code, stored on the computer-readable storage media and responsive to determining that the correlation coefficient indicates the negative correlation, for:

determining the expected metric direction of the metric;

generating an action recommendation to reduce the metric during a period of time when the metric values of the metric are high based on the threshold responsive to determining that the expected metric direction of the metric is increase; and generating an action recommendation to increase the metric during a period of time when the metric values of the metric are low based on the threshold responsive to determining that the expected metric direction of the metric is decrease.

19. The computer program product of claim 17, wherein the sixth program code comprises:

program code, stored on the computer-readable storage media, for calculating input values for the recommendation pattern when the correlation coefficient indicates that the correlation between the key performance indicator and the metric is sufficiently significant; and program code, stored on the computer-readable storage media, for generating the human readable recommendation using the recommendation pattern and the input values for the recommendation pattern.

20. The computer program product of claim 17, wherein the sixth program code comprises:

program code, stored on the computer-readable storage media, for generating the human readable recommendation using the recommendation pattern when the correlation coefficient indicates that the correlation between the key performance indicator and the metric is sufficiently significant; and program code, stored on the computer-readable storage media, for generating a human readable relationship using a relationship pattern when the correlation coefficient indicates that the correlation between the key performance indicator and the metric is sufficiently significant.

* * * * *